(12) United States Patent
Nakamura (10) Patent No.: US 9,030,713 B2
(45) Date of Patent: May 12, 2015

(54) DATA PROCESSING APPARATUS AND DATA PROCESSING METHOD

(75) Inventor: Hironori Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 577 days.

(21) Appl. No.: 13/175,162

(22) Filed: Jul. 1, 2011

(65) Prior Publication Data
US 2012/0026540 A1 Feb. 2, 2012

(30) Foreign Application Priority Data

Jul. 27, 2010 (JP) ................................. 2010-168484

(51) Int. Cl.
*G06T 1/60* (2006.01)
*H04N 19/423* (2014.01)
*H04N 1/405* (2006.01)

(52) U.S. Cl.
CPC . *G06T 1/60* (2013.01); *H04N 1/405* (2013.01); *H04N 19/423* (2014.01)

(58) Field of Classification Search
None
See application file for complete search history.

(56) References Cited

U.S. PATENT DOCUMENTS

| | | | |
|---|---|---|---|
| 5,283,537 A | 2/1994 | Nakamura | |
| 5,689,670 A * | 11/1997 | Luk | ............................... 712/207 |
| 7,130,083 B1 | 10/2006 | Konno et al. | |
| 7,477,422 B2 | 1/2009 | Konno et al. | |
| 2002/0036783 A1* | 3/2002 | Yoshidome | ..................... 358/1.9 |
| 2004/0234135 A1* | 11/2004 | Nomizu | ........................ 382/209 |
| 2010/0296732 A1* | 11/2010 | Ito | .................................. 382/173 |
| 2010/0315662 A1* | 12/2010 | Fukunishi | ...................... 358/1.9 |

FOREIGN PATENT DOCUMENTS

| | | |
|---|---|---|
| JP | 2001-054956 A | 2/2001 |
| JP | 2002-269577 A | 9/2002 |
| JP | 2004-015213 A | 1/2004 |
| JP | 2004-274131 A | 9/2004 |
| JP | 2005-157530 A | 6/2005 |

* cited by examiner

*Primary Examiner* — Fred Guillermety
*Assistant Examiner* — Keara Harris
(74) *Attorney, Agent, or Firm* — Fitzpatrick, Cella, Harper & Scinto (57) ABSTRACT

Provided is a data processing method that is capable of high-speed processing without using a large cache memory, while correlating 2-dimensional parameters with a plurality of data without damaging the arrangement rule. Therefore, when there is a continuing M-line parameter after a previously read M-line parameter in a 2-dimensional table that is stored in an external memory 406, the contents of the cache memory 404 are updated with this continuing M-line parameter as the new parameter. When there is no continuing M-line parameter after the previously read M-line parameter in the 2-dimensional table, the contents of the cache memory 404 are updated with the continuing M-line parameter after returning to the starting line of the 2-dimensional table as the new parameter. Such an update rule is maintained even when the band, which is the processing unit, is changed, or even in the progress of band processing.

22 Claims, 11 Drawing Sheets

DATA PROCESSING APPARATUS AND DATA PROCESSING METHOD

BACKGROUND OF THE INVENTION

1. Field of the Invention

The present invention relates to data processing that performs processing of 2-dimensionally arranged parameter information without damaging the arrangement rules by correlating image data to respective pixel locations. The present invention more particularly relates to a method of performing processing of all of the pixels of an area within image data without damaging the arrangement rules of 2-dimensional parameters even when the number of lines included in a unit of image processing (band) within the image data and the number of lines of 2-dimensional parameter information are not in agreement.

2. Description of the Related Art

Processing that correlates parameters, for which a positional relationship with each other has been set, with a plurality of data, for which the position relationship with each other has also been set, is used in various situations. For example, in image processing that generates data for an image to be printed by a printing apparatus, there is processing that correlates a binary dot pattern with the multi-value data of the individual pixels. Moreover, there is also processing for multi-pass printing that sets the dots that will actually be printed in each scan by correlating a mask pattern, for which the dots that are allowed and not allowed to be printed are set in advance, to dot patterns of individual pixels that are generated in this way.

When this kind of dot pattern or mask pattern is set for an image area non-periodically when possible, there is a need for a memory that stores the plurality of parameters that correspond to respective pixel locations in the image area such that they are in a state of having a fixed positional relationship with each other, or in other words, such that they are stored two dimensionally. However, when a CPU that performs the image processing above performs processing while sequentially accessing the memory where this kind of a plurality of parameters is stored, much time is required for the processing, so that, in the case of a printing apparatus, the printing speed is reduced.

In order to improve such a drop in processing speed, a method is known by which a high-speed memory (cache memory) is provided in the circuit that executes the processing, and processing is executed after the data that is stored in the large-capacity memory above (low-speed memory) has been stored in the high-speed memory. As a result, it is possible to reduce the number of times that the low-speed memory is accessed, and thus it is possible to reduce the time needed for image processing without affecting the printing speed. However, when a 2-dimensional table that is prepared for the non-periodic arrangement above is too large, the cache memory that is prepared in the circuit, or in other words, the scale of the circuit becomes large, and thus the cost increases.

In this way, conventionally, when correlating parameters that were arranged non-periodically with individual data it was difficult to achieve both a suitable circuit scale and high-speed processing.

Therefore, in Japanese Patent Laid-Open No. 2002-269577 construction is disclosed wherein part of the parameters stored in the low-speed memory are read into the cache memory, and processing is performed in order with the area corresponding to the stored parameters as the processing unit. By employing the method disclosed in Japanese Patent Laid-Open No. 2002-269577, as long as there is small memory capacity capable of storing only a one-line parameter, for example, access and processing can be performed at higher speed than was possible conventionally, even when it is not possible to store a large amount of information at one time in the cache memory.

However, in this case, even though it is possible to suppress the capacity of the cache memory, in a circuit which requires setting the CPU for each unit of processing, it becomes necessary for the CPU to access the settings and image data for each line, which may lead to an increase in overhead.

SUMMARY OF THE INVENTION

The object of the present invention is to solve the problems described above. Therefore, the object of the present invention is to provide a data processing method that, while correlating 2-dimensional parameters with a plurality of data without damaging the arrangement rules, is capable of high-speed processing.

In a first aspect of the present invention, there is provided a data processing apparatus comprising: an image processing unit configured to perform processing of 2-dimensionally arranged image data by correlating a 2-dimensionally arranged data having L lines (L≥2)×N column (N≥1) by M line as a unit (L>M≥2); and a control unit configured to specify information regarding to a position in the 2-dimensionally arranged data for a first line of the image data for the data processing of the image processing unit by M line as a unit, wherein the image processing unit correlates the first line and subsequent lines of the image data with the 2-dimensionally arranged data according to the information specified by the control unit and correlates a line following to a line of the image data that is correlated with a Lth line of the 2-dimensionally arranged data with the first line of the 2-dimensionally arranged data.

In a second aspect of the present invention, there is provided a data processing method comprising: an image processing step for performing processing of 2-dimensionally arranged image data by M line as a unit (L>M≥2) by correlating a 2-dimensionally arranged data having L lines (L≥2)×N column (N≥1); and a controlling step for specifying information regarding to a position in the 2-dimensionally arranged data for a first line of the image data for the data processing of the image processing unit by M line as a unit, wherein the image processing step the image data of the first line and subsequent lines are correlated with the 2-dimensionally arranged data according to the information specified by the controlling step and the image data of a line following to a line that is correlated with a Lth line of the 2-dimensionally arranged data is correlated with the first line of the 2-dimensionally arranged data.

Further features of the present invention will become apparent from the following description of exemplary embodiments (with reference to the attached drawings).

DESCRIPTION OF THE EMBODIMENTS

In the following, embodiments of the present invention will be explained in detail with reference to the accompanying drawings. The subject of the embodiments explained below is processing executed by an INDEX processing unit in the image processing disclosed in Japanese Patent Laid-Open No. 2004-015213. However, the present invention is not limited to this kind of image processing. The effect of the present invention can be displayed as long as construction is such that processing is performed while performing one-on-one correlation of individual parameter values of a 2-dimensional table that is stored in an external memory with each of a plurality of data, for which a positional relationship with each other is set, without damaging that arrangement rule.

Embodiment 1

Figure 1:
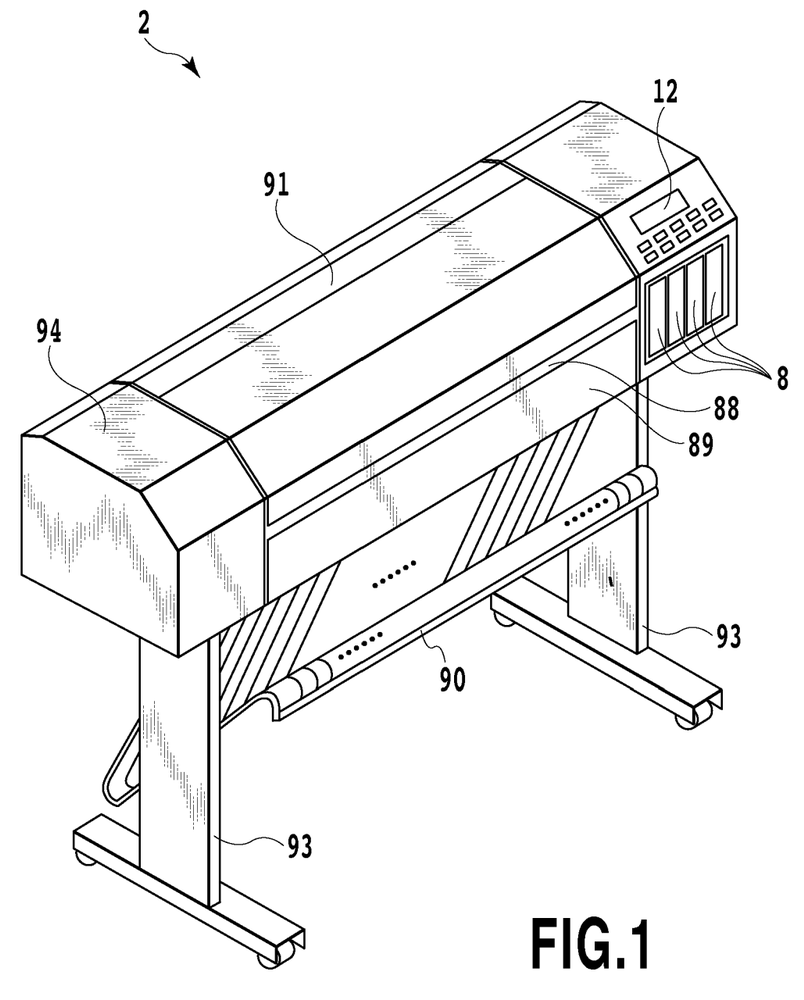
FIG. 1 is a perspective drawing of the exterior of an inkjet printer that can be used in the present invention.

FIG. 1 is a perspective drawing of the exterior of an inkjet printer (hereafter, referred to as printing apparatus) 2 that is capable of being applied to the present invention. The printing apparatus 2 of this embodiment is an inkjet printer that is capable of printing image data that is received from an externally connected host apparatus onto a relatively large-sized, such as A0 size or B0 size, printing medium. On the front surface of the main unit 94 that is supported by two leg units 93, there is a manual feed insert opening 88 and a paper-roll cassette 89. During printing, a printing head inside the main unit ejects ink according to image data onto a printing medium that is fed from the manual feed insert opening 88 or paper-roll cassette 89. The printing medium after printing is discharged to a stacker 90.

The printing head prints an image using the four colors of ink cyan, magenta, yellow and black, with the four colors of ink being supplied from an ink supply unit 8. An upper cover 91 is a transparent cover that can be opened and closed. With the upper cover 91 closed it is possible to observe the printing head and printing medium during the printing operation. On the other hand, with the upper cover 91 opened, it is possible to replace the printing head, perform maintenance on the printing apparatus 2 and the like. An operation panel 12 has input keys for setting the printing method and the printing medium and a screen for displaying information about the printing apparatus.

Figure 2:
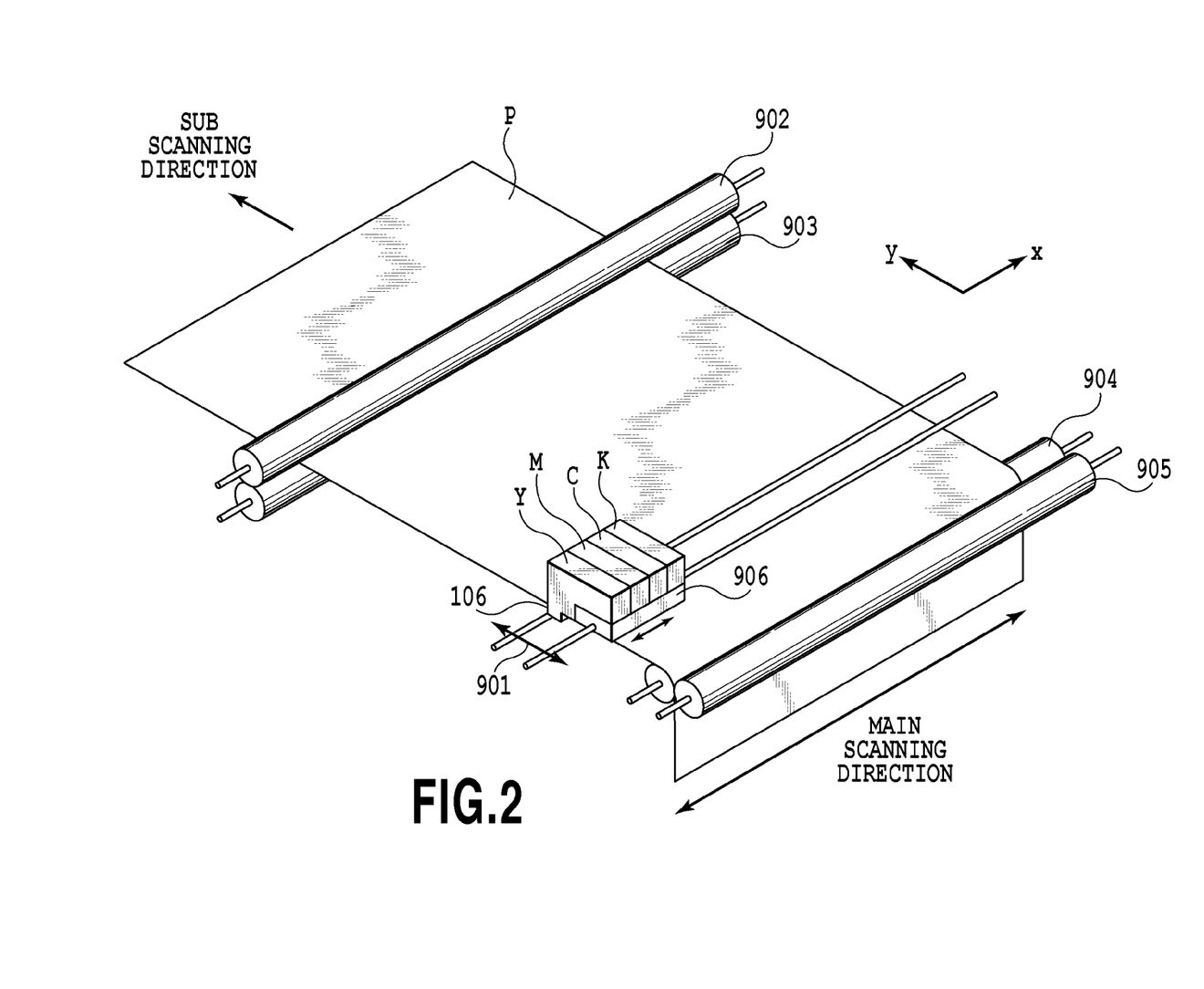
FIG. 2 is a perspective drawing for explaining the construction of the printing unit of the printing apparatus.

FIG. 2 is a perspective drawing for explaining the construction of the printing unit of the printing apparatus 2. The printing head 106 is mounted inside a carriage 906 that moves at a constant speed in the main scanning direction (X direction), and the printing head 106 ejects ink drops at a frequency that corresponds to the constant speed. Each time this kind of main printing scan is completed one time, the printing medium P, which is between a feed roller 904 and auxiliary roller 905 pair, and a between a conveying roller 902 and auxiliary roller 903 pair, is conveyed a specified amount in the sub scanning direction (Y direction). By alternately repeating the main printing scan and the conveying operation, an image is gradually printing on the printing medium P in stages.

The printing head 106 is constructed as illustrated in the figure so that a black (K), cyan (C), magenta (M) and yellow (Y) printing head are arranged in a row in the X direction. A plurality of printing elements are arranged in the printing head of each color with a density of 1200 dpi (dots/inch) in the Y direction, and the elements eject ink that is supplied from the ink supply unit 8 according to image data. Generally, in the case of a serial type inkjet printer, the unit of an image that can be printed in one main printing scan is called a "band"; however, in this specification, a "band" is not defined in this way. In this specification, a "band" is a unit of data for which the CPU performs image processing together at one time. A "band" in this specification will be described in detail later.

Figure 3:
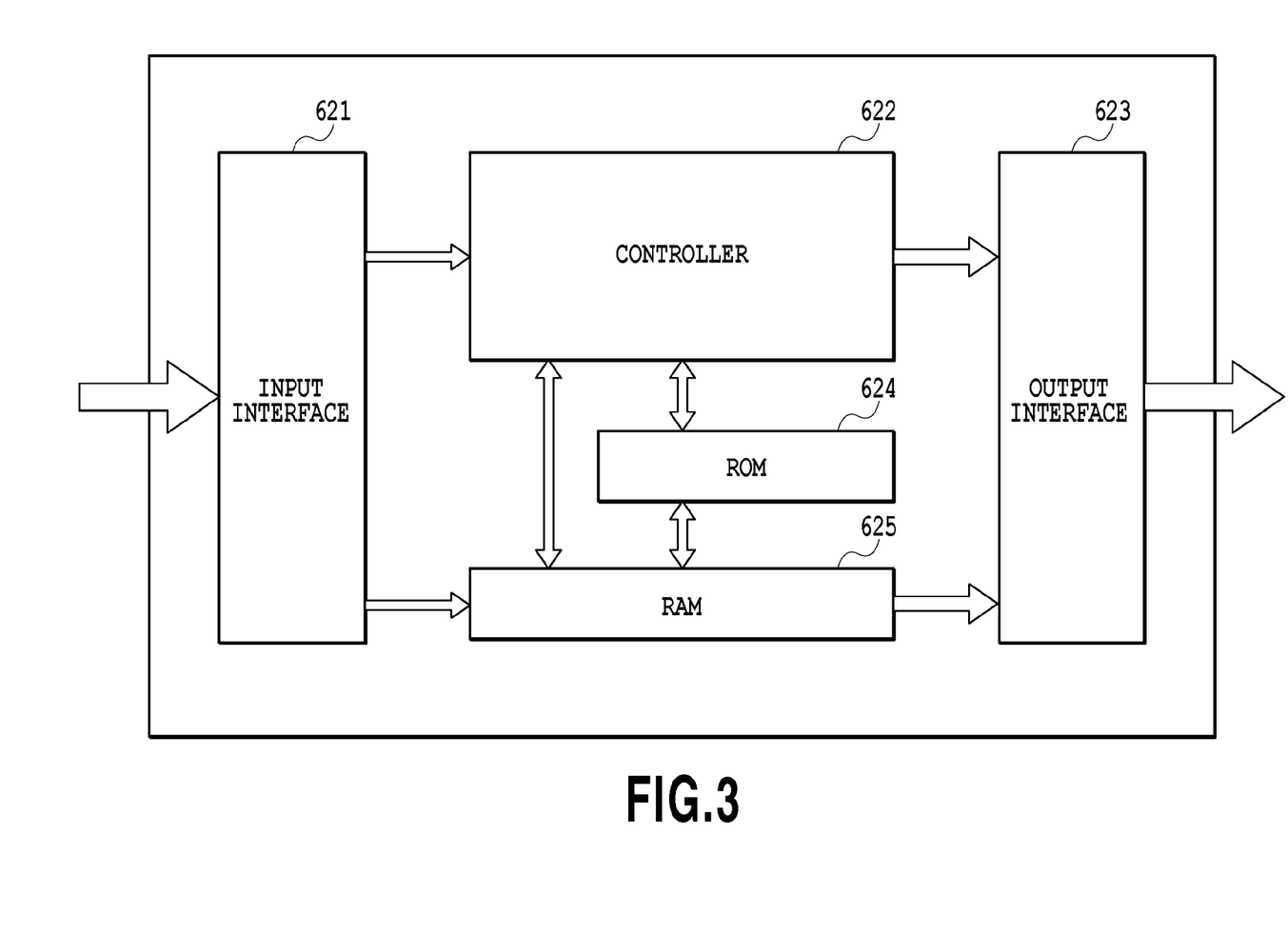
FIG. 3 is a block diagram for explaining the configuration for control of the printing apparatus.

FIG. 3 is a block diagram for explaining the configuration of control of the inkjet printer 2. An input interface 621 receives input information from a host apparatus that is externally connected to the printing apparatus or from the operation panel 12. A controller 622, in addition to a CPU, is constructed from a circuit that is the feature of the present invention, and this controller 622 performs overall control of the printing apparatus according to various programs that are stored in a ROM 624. For example, the controller 622, using image data received from a host apparatus via the input interface 621, generates printing data according to a program stored in the ROM 624 such that the printing data can be printed by the printing head 106. The generated printing data is outputted to the printing head 106 via a output interface 623. In addition to programs, various parameters such as a color separation table that is used in image processing, or the 2-dimensional table that is a feature of the present invention are stored in the ROM 624. The RAM 620, in addition to being used for the image processing described above, is used as a work area when the controller 622 executes various processing.

Furthermore, the CPU sets image processing parameters for generating data in an image processing unit in the controller 622 according to information that is obtained from the ROM 624 or a host device via input interface 621. In addition, the CPU develops a part of the image processing parameter that is need for image processing in the RAM 620, and if necessary develops them developed in the image processing unit in the controller 622 again. In this time, if the parameter of the image processing unit of controller 622 is updated during the CPU performs a processing other than image processing the updating of the parameter is disturbed and a throughput of whole of image processing is decreased.

Figure 4:
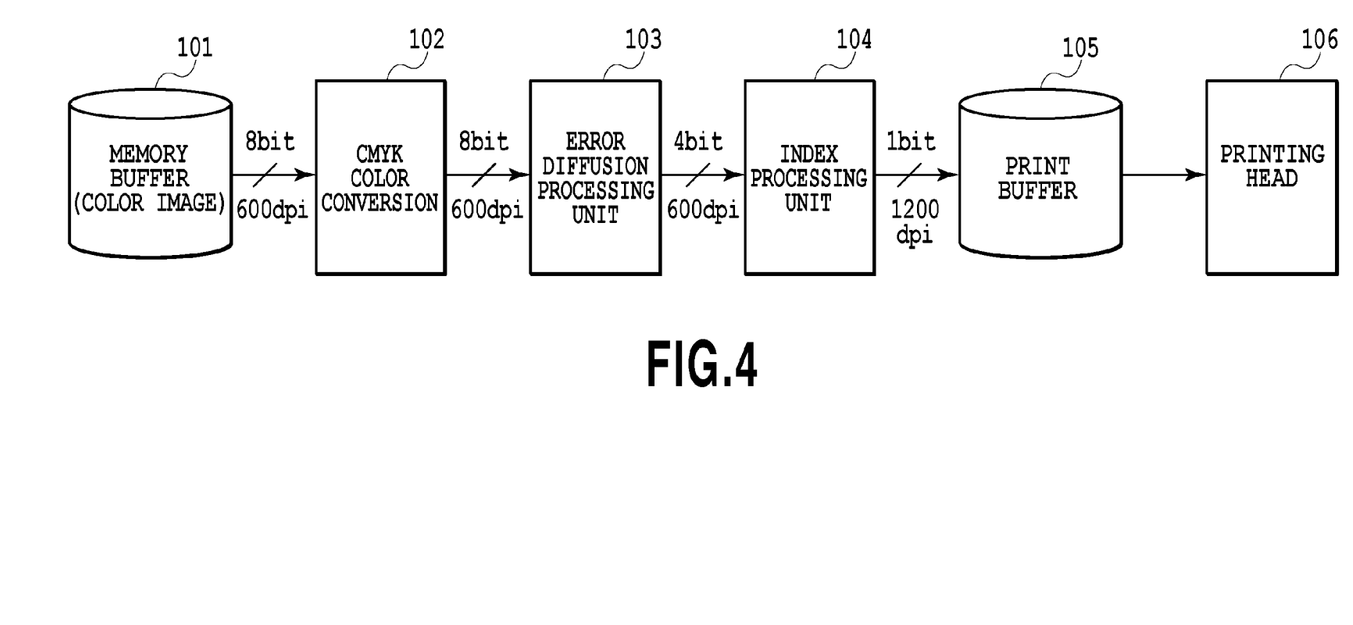
FIG. 4 is a block diagram for explaining the steps of image processing.

FIG. 4 is a block diagram for explaining the steps of image processing executed by the controller 622. When image data that is to be printed is received from an externally connected host, that image data is stored in a memory buffer 101 in the printing apparatus. The image data at that time has a resolution of 600 dpi, and is multi-value image data (R, G, B) that is expressed by 8 bits and 256 gradations per pixel. The multi-value image data that is stored in the memory buffer 101 is transferred after that to a CMYK color conversion unit 102 one pixel at a time, and converted to multi-value image data (600 dpi, 8 bits) that corresponds to the ink colors CMYK that are used by the printing apparatus. The image data for each color that is converted by the CMYK color conversion unit 102 is converted to low gradation by an error diffusion processing unit 103, and is quantized to 5 gradations.

The 5-gradation grayscale data that was quantized by the error diffusion processing unit 103 is further binarized by an INDEX processing unit 104. Then, for each individual pixel that corresponds to the 1200 dpi printing resolution of the printing head 106, data is converted to binary data that indicates whether a dot is to be printed (1) or not printed (0). This kind of binary printing data (1200 dpi, 1 bit) is stored in a print buffer 105 for each ink color. After binary data for performing one printing scan has been stored in the print buffer 105, the printing head 106 performs one printing scan according to the binary data stored in the print buffer 105.

Here, the case of performing an INDEX process for each band by referencing an INDEX table that is stored in memory according to the method disclosed in Japanese Patent Laid-Open No. 2002-269577 will be considered. In this case, the area (number) of 2-dimensional data that is stored in memory beforehand is not limited to being matched to the size of a band.

Figure 11:
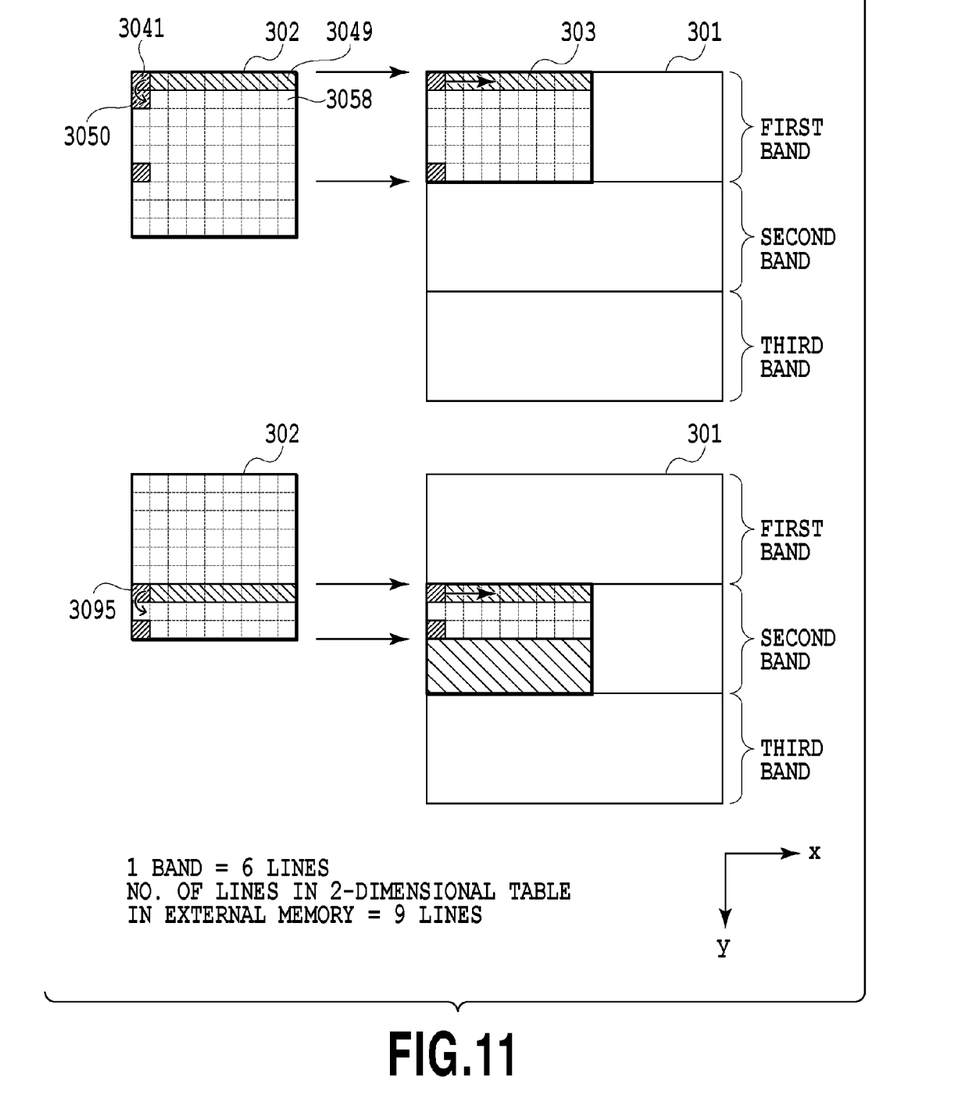
FIG. 11 is a drawing for explaining the correspondence between the 2-dimensional table and image data.

FIG. 11 is a schematic diagram for explaining the correlation between the arrangement of parameters stored 2-dimensionally in an external memory, and image data that is to be processed using the parameters. Here, for simplicity, the image data 301 is taken to have an area of 18 pixels (18 lines) in the Y direction and 10 pixels or more in the X direction. The image data 301 is also separated into three bands having 6 lines each, and one band at a time is called by the CPU and processed. On the other hand, 2-dimensional parameters 302 that are stored in the external memory comprise 81 items of data, with there being 9 pixels in the X direction and 9 pixels (lines) in the Y direction.

In this case, first, in order to process the image of the first band, the CPU accesses the external memory and specifies the address 3041 of the 2-dimensional parameter 302 as the starting address for reading. Then, for this top line, the CPU stores a group of nine data, which are stored in the area from the starting address 3041 to the ninth address 3049 in the X direction and that are included in the area 303 indicated in diagonal line, in a cache memory. The individual pixel data that are arranged in the first line of the first band of image data 301 are processed according to the group of nine data.

For the second line of the first band, the CPU specifies the address 3050 that has been shifted one line in the Y direction from the address 3041 as the starting address for reading. The CPU then stores a group of nine data, which are stored in the area from the starting address 3050 to the ninth address 3058 in the X direction, in the cache memory. The individual pixel data that are arranged in the second line of the first band of image data 301 are processed according to the group of such nine data. The CPU repeats the operation above and completes reading and processing the data up to the sixth line of the first band. In this way, it is possible to process the first band correlating the individual pixels of the image data 301 without losing the arrangement relationship of the 2-dimensional parameter 302.

When processing the image of the second band, the CPU specifies the starting address 3095 of the seventh line following the sixth line, which has already been read as the starting address for reading the 2-dimensional parameter 302. Then, as in the case of the first band, proceeds reading and processing the next lines in order. However, for the second band, after processing the first three lines, all of the data of the 2-dimensional parameter 302 has been read. In other words, in the case of construction in which within the same band the position of the starting address is shifted in the Y direction one line at a time, it becomes impossible to specify the starting address for the fourth line.

In order to avoid this kind of situation, a method can also be considered in which the number of lines that are included in a band, which is the unit of processing, is suitably set to correspond with the number of lines of the 2-dimensional parameter. In the case of this example, by setting the number of lines of the second band as three lines, processing of the second band can be completed with no problem, and it is also possible to smoothly start processing of the third band from the start. However, when a new job of setting the number of lines of each band is added, management of the number of lines becomes complicated, a further load is placed on the CPU, and it becomes difficult to effectively avoid overhead. In this embodiment, the INDEX processing unit 104 is prepared so as to be able to avoid the overhead of the CPU.

Figure 5:
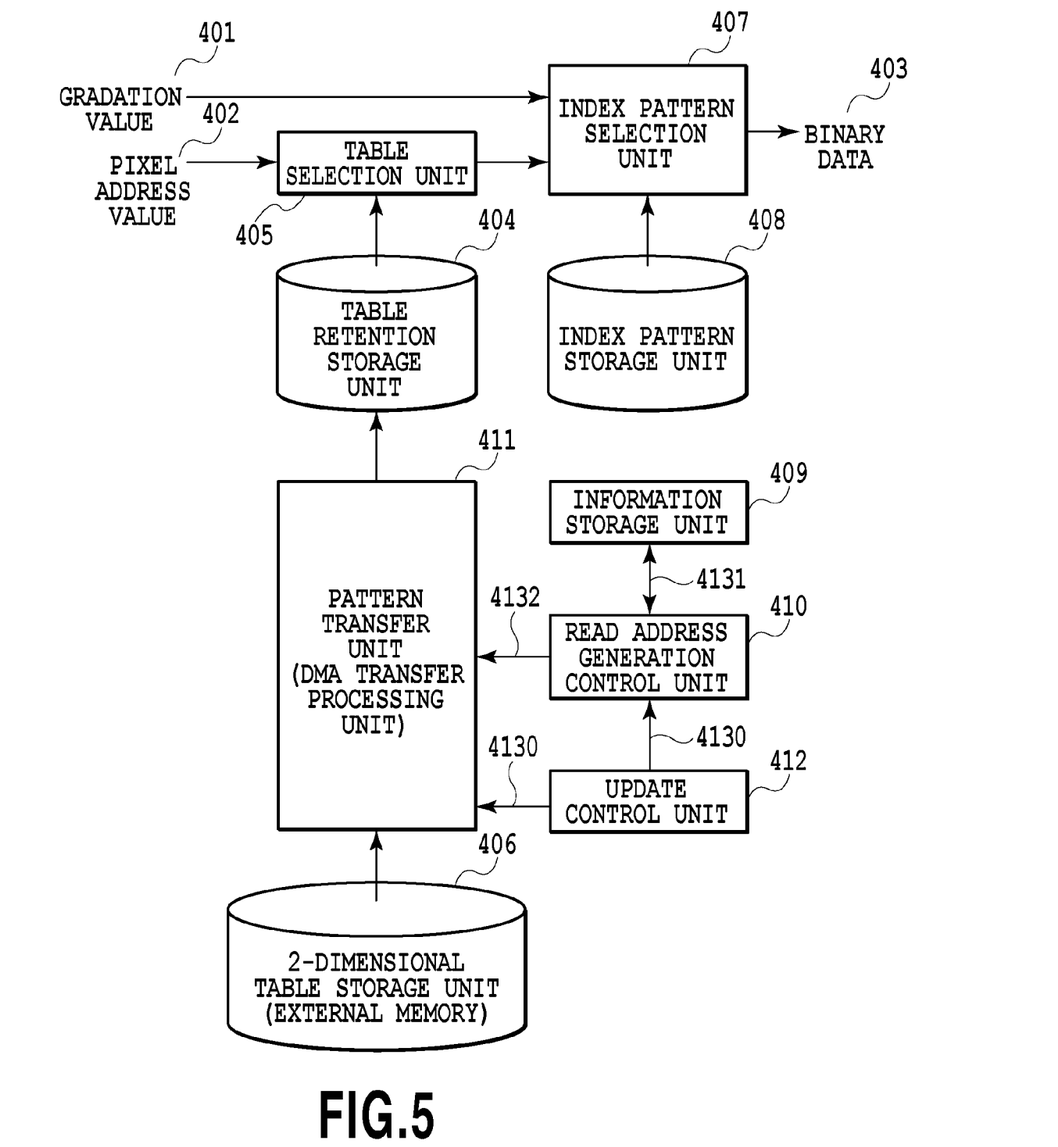
FIG. 5 is a circuit diagram of a circuit that executes the detailed processes of the INDEX processing unit.

FIG. 5 is a diagram of a circuit that executes the detailed processes of the INDEX processing unit 104 of this embodiment. This INDEX processing unit 104 is controlled by the CPU. The CPU sets starting value at first and it does not access the INDEX processing unit 104 until the image processing for one band is finished. The process of updating parameter is executed by hardware in the INDEX processing unit 104 without using the CPU until the image processing for one band is finished. By this construction, an overhead of the CPU can be avoided. Data that is outputted from the error diffusion processing unit 103 has a 5-gradation level value (gradation value) 401 and an address value 402 that indicates the position of the pixel. The level value 401 is 5-gradation gradation data that corresponds to each 600 dpi pixel, and has a value 0 to 4. An INDEX pattern selection unit 407, using this kind of level value 401 and pixel address value 402, outputs binary data 403 for which printing (1) or no printing (0) of dots has been set for each pixel of a 1200 dpi 2 pixels×2 pixels array.

Figure 6:
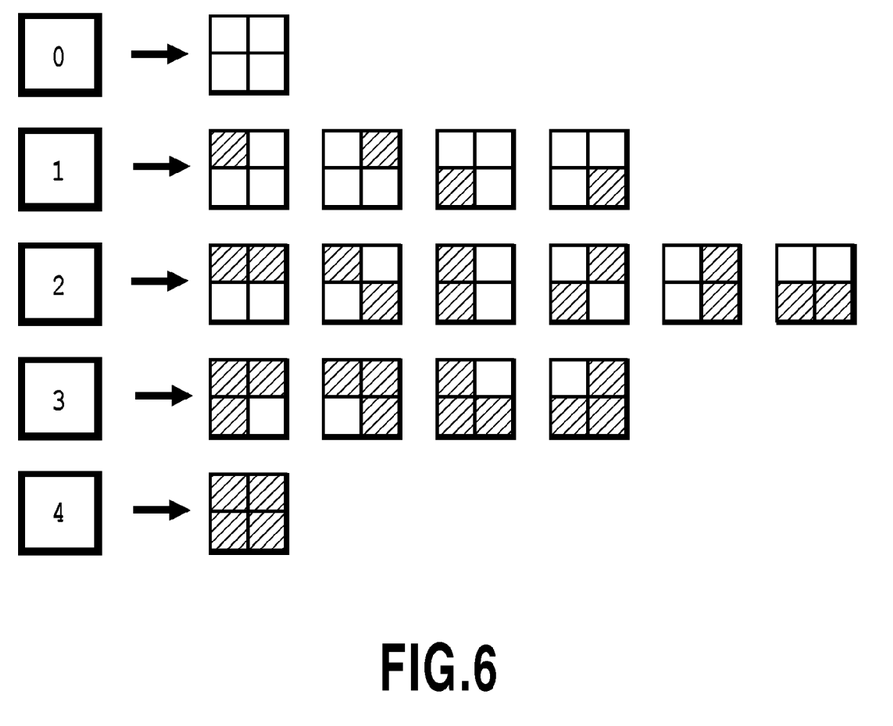
FIG. 6 is a diagram illustrating a plurality of dot patterns for each level.

FIG. 6 is a drawing that illustrates a plurality of patterns (plurality of binary data) that sets which pixels of the 2 pixels×2 pixels will be printed pixels and which pixels will be non-printed pixels for each level. In FIG. 6, the areas indicated by diagonal lines are printed pixels (1) for which dots are printed, and areas indicated by white are non-printed pixels (0). Generally, when the level of inputted data is 0, all of the pixels of the 2 pixels×2 pixels are non-printed pixels (0), and there are no printed pixels (1). Therefore, for level 0, only one pattern in which all of the pixels of the 2 pixels×2 pixels are non-printed pixels is prepared. When the level of inputted data is 1, three pixels of the 2 pixels×2 pixels are non-printed pixels (0), and one pixel is a printed pixel (1). Therefore, for level 1, four patterns as illustrated in the figure are prepared. When the level of inputted data is 2, two pixels of the 2 pixels×2 pixels are non-printed pixels (0), and two pixels are printed pixels (1). Therefore, for level 2, six patterns as illustrated in the figure are prepared. When the level of inputted data is 3, one pixel of the 2 pixels×2 pixels is a non-printed pixel (0), and three pixels are printed pixels (1). Therefore, for level 3, four patterns as illustrated in the figure are prepared. Furthermore, when the level of inputted data is 4, all of the pixels of the 2 pixels×2 pixels are printed pixels (1). Therefore, for level 4 one pattern as illustrated in the figure is prepared.

In this embodiment, the plurality of dot patterns that correspond to these individual levels are stored in an INDEX pattern storage unit 408, and an INDEX pattern selection unit 407 selects one pattern from the plurality of patterns according to the position of the pixel of interest.

Figure 7:
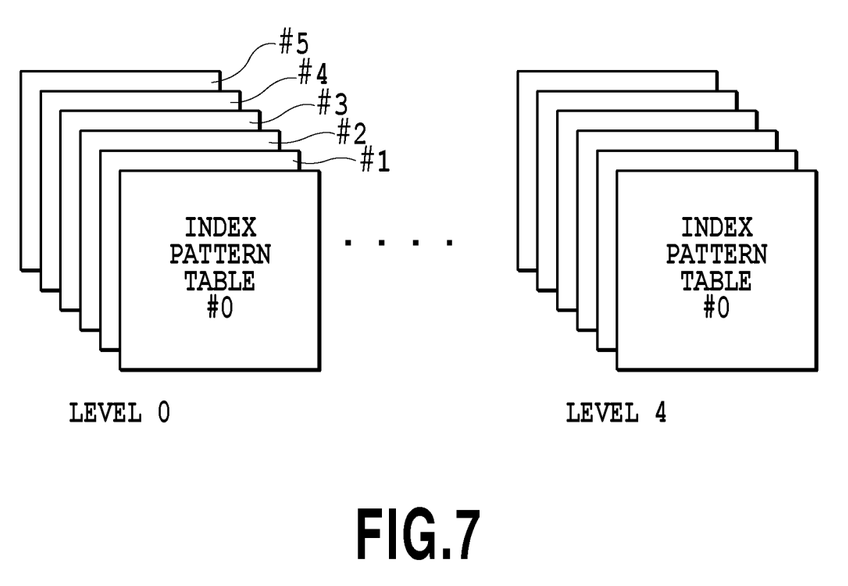
FIG. 7 is a schematic diagram for explaining the stored state of a plurality of dot patterns.

FIG. 7 is a schematic diagram for explaining the stored state of a plurality of dot patterns (binary data) in the INDEX pattern storage unit 408. Here, six patterns #0 to #5 are prepared for the respective levels, level 1 to level 4. The individual patterns correspond to the 4-bit data that corresponds to the 2 pixels×2 pixels illustrated in FIG. 6. As illustrated in FIG. 6, for levels other than level 2, six patterns are not need; however, in this embodiment, for all of the levels, one of the patterns illustrated in FIG. 6 is stored for each of the patterns #0 to #5. For example, for level 4, a pattern in which all of the pixels of the 2 pixels×2 pixels are printed pixels (1) is stored for all patterns #0 to #5, and for level 3, one of the four patterns illustrated in FIG. 6 is stored for all of the patterns #0 to #5. For level 2, one of the six patterns illustrated in FIG. 6 is stored to correspond to each respective pattern #0 to #5.

The INDEX pattern selection unit 407 selects one of the plurality of patterns according to the position of the pixel in question. Therefore, in this embodiment, a table selection unit 405, according to the pixel address value 402, specifies one of the tables #0 to #5 that are stored in the INDEX pattern storage unit. Then, by performing selection so that the plurality of patterns is replaced at the position of a pixel in the image, the same pattern does not continue in the main scanning direction or sub scanning direction even when the inputted data (gradation value) is the same. According to study by the inventors, it is preferred that the plurality of patterns used be non-periodic and unbiased in the main scanning direction and sub scanning direction. Therefore, in this embodiment, a 2-dimensional table, in which the table numbers (#0 to #5) that correspond to a pixel position have been set beforehand, is stored in an external memory 406, which is a first storage unit. This 2-dimensional table is used in common with the gradation values.

Above, an example is given of construction in which 600 dpi 5-value data is converted to 1200 dpi binary data, so the INDEX pattern is 2 pixel×2 pixel 4-bit data, and the maximum number of patterns is the six types that correspond to level 2. However, of course the present invention is not limited to this kind of construction. When an N pixel×M pixel (N, M>2) INDEX pattern is used in order to perform binarization, it is possible to prepare even more patterns for one level (for example, L types of patterns). In this case, it is only necessary to prepare more types (#0 to #L-1) of tables for managing the INDEX patterns illustrated in FIG. 7. Moreover, for level 0 or level 4 in which only one INDEX pattern is prepared, binary data (0 or 1) can be outputted as is without specially specifying an INDEX pattern from the table number.

Figure 8:
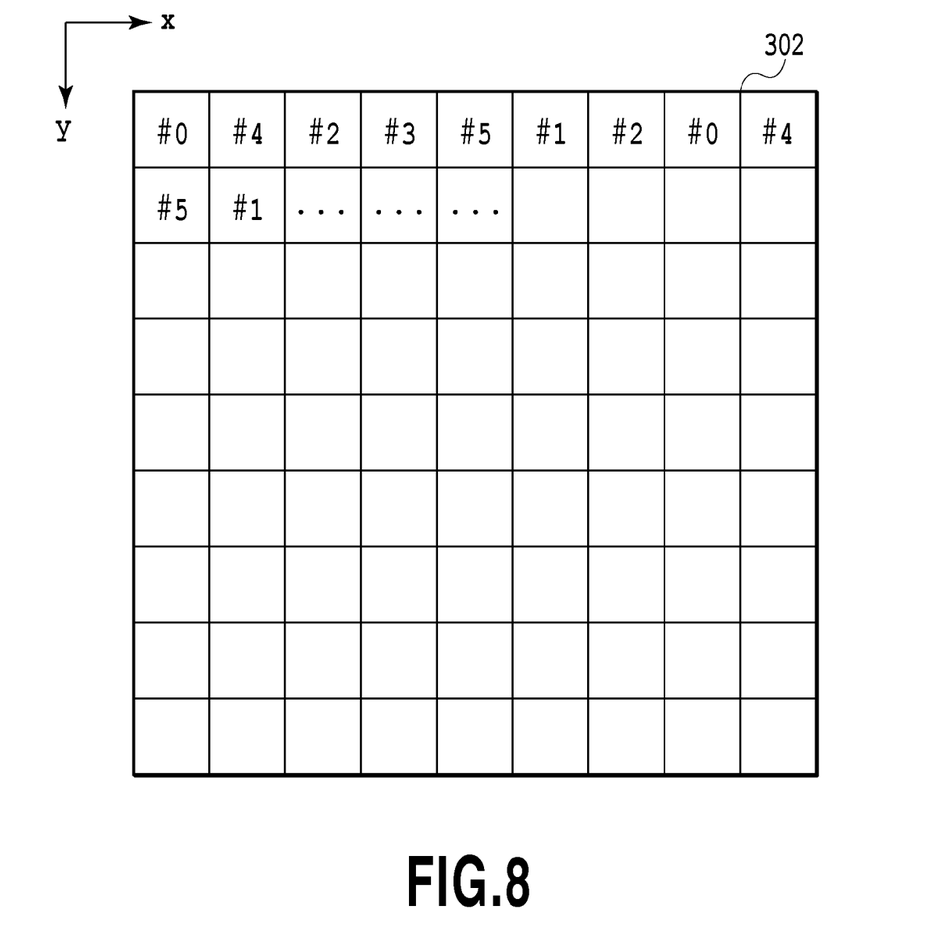
FIG. 8 is a drawing illustrating an example of a 2-dimensional table.

FIG. 8 is a drawing illustrating an example of a 2-dimensional table for setting an INDEX pattern according to the pixel position. Here, the X direction corresponds to the advancement direction of the carriage, or in other words, the main scanning direction, and the Y direction corresponds to the conveying direction of the printing medium, or in other words, the sub scanning direction. In order that the table numbers are arranged such that the table numbers correspond with individual pixels of image data, the arrangement of the table numbers is such that the individual table numbers are non periodic and uniform.

In this embodiment, a 2-dimensional table for nine lines in this way is prepared, and of these nine lines, one line is called by a parameter transfer unit 411 and temporarily stored in a rewritable table retention storage unit 404, which is a second storage unit. The table selection unit 405 then selects, according to the pixel address value 402, one table number from the table numbers of the one line that is stored in the table retention storage unit 404, and specifies this table number for the INDEX pattern selection unit 407. The INDEX pattern selection unit 407, again referencing FIG. 7, selects an INDEX pattern from among the plurality of patterns corresponding to the inputted level value 401 that corresponds to the specified table number, and outputs that pattern as binary data 403. The 2-dimensional table only comprises table numbers for nine pixels per line, so that when there are ten pixels or more per line of image data, the table for this one line (nine pixels) is repeatedly used.

Referring again to FIG. 5, each time INDEX processing for one line is complete, an update control unit 412 transmits a timing signal 4130 to the parameter transfer unit 411 so that the table numbers in the table retention storage unit 404 are updated. Moreover, a read address generation control unit 410, based on various information that is stored in an information storage unit 409, specifies information (read address signal 4132) that indicates which address in the 2-dimensional table to start transferring from for the next update. The starting address (T) of the first line of the 2-dimensional table, and the address offset value (Ao) between lines of the 2-dimensional table are stored in the information storage unit 409. The parameter transfer unit 411 updates the table numbers in the table retention storage unit 404 according to the timing signal 4130 that was specified by the update control unit 412, and the read address signal 4132 that was specified by the read address generation control unit 410.

Figure 9:
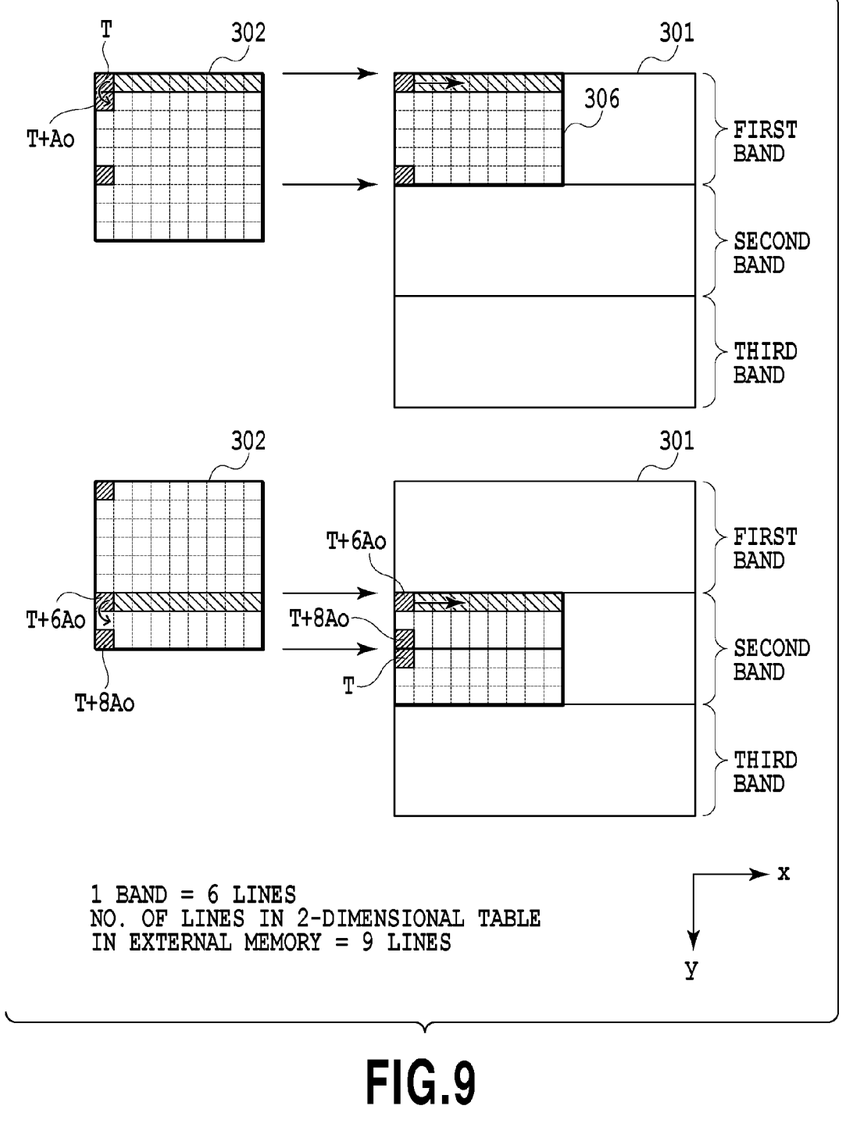
FIG. 9 is a schematic diagram for explaining the correspondence between the 2-dimensional table and the image data.
Figure 10:
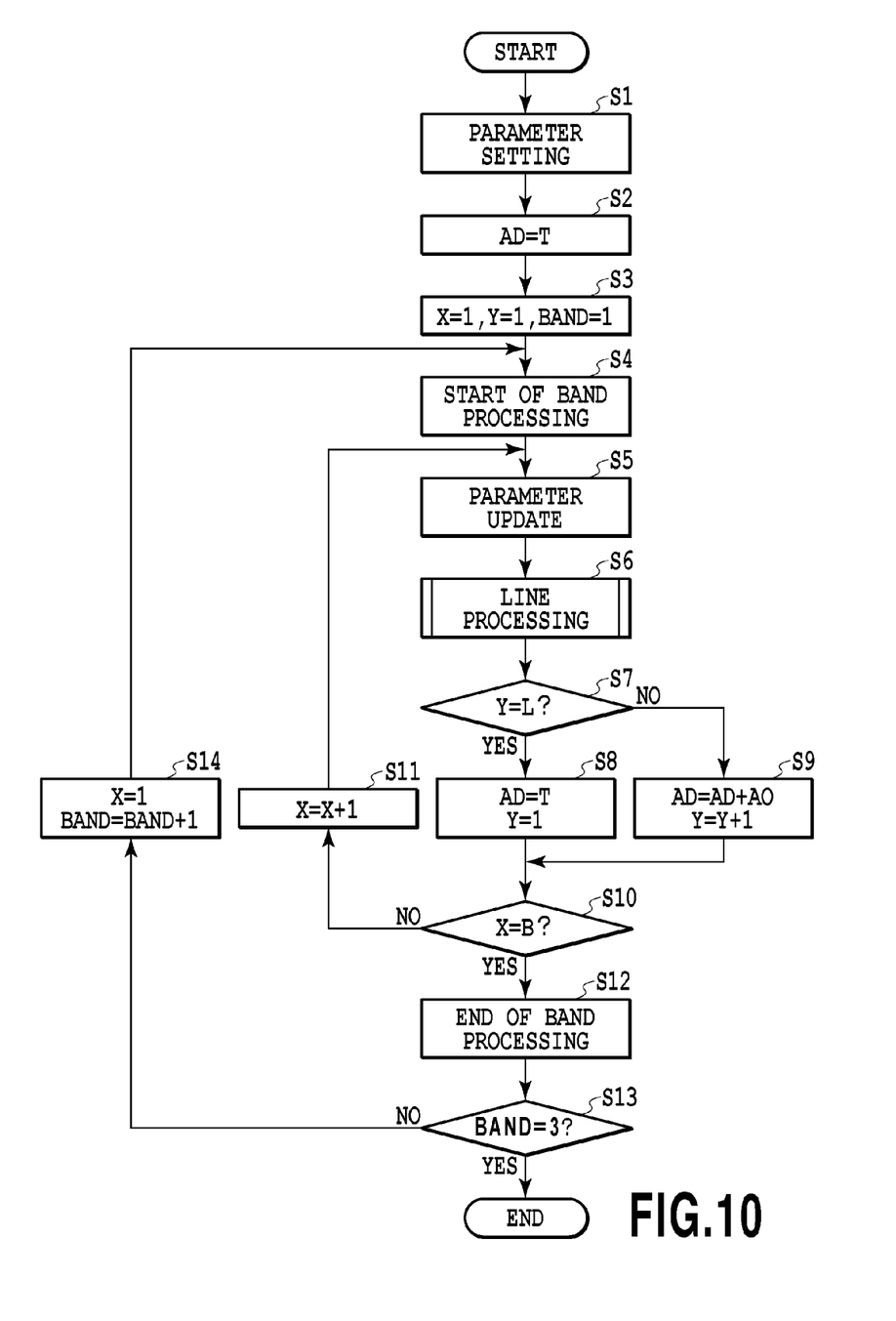
FIG. 10 is a flowchart for explaining the steps of the INDEX process.

FIG. 9 is a schematic diagram for explaining the correlation between the 2-dimensional table of this embodiment and the image data that is to be processed according to the individual table numbers stored in that table, while making a comparison with FIG. 11. Here, in this example, the 2-dimensional table has nine lines and the image data has three bands of 6 lines each. FIG. 10 is a flowchart for explaining the processes in INDEX processing of this kind of image data. In the following, each of the processes in the flowchart of FIG. 10 will be explained while referencing FIG. 9.

After this processing starts, first, in step S1, the CPU sets the starting address T of the 2-dimensional table, the address offset Ao between lines in the 2-dimensional table, and the number of lines B included in one band in the information storage unit 409. Next, in steps S2 and S3, initial setting of the variables used in the processing is performed. More specifically, in step S2, the read address AD is set as the starting address of the 2-dimensional table (AD=T). Also, in step S3, a counter X (1≤X≤6) for managing the lines inside a band one at a time, and a counter Y (1≤Y≤9) for managing the read lines in the 2-dimensional table 302 one at a time are set to 1. Moreover, a counter Band (1≤Band≤3) for managing three bands in an image is also set to 1.

In step S4, the CPU performs various settings for starting band processing of the band in question. After band processing has started, the update control unit 412 notifies the read address generation control unit 410 and parameter transfer unit 411 with an update instruction. After receiving this instruction, the parameter transfer unit 411 reads new parameters (table number) for one line from the 2-dimensional table 406 according to a read address AD that is obtained from the read address generation control unit 410, and updates the contents of the table retention storage unit 404 (step S5).

After that, in step S6, image processing is performed while correlating parameters of one line that is stored in the table retention storage unit 404 with the pixels that are included in the one line of interest in the band. More specifically, the table selection unit 405 selects one table number that is arranged in sequence in the table retention storage unit 404 based on the pixel address value 402 of the pixel in question. The INDEX pattern selection unit 407 then reads the INDEX pattern that corresponds to the selected table number from the INDEX pattern storage unit 408, and outputs that pattern as binary data 403. This conversion process is performed for one line of image data.

In step S7, whether or not the line counter value Y for the 2-dimensional table is the same value as the number of lines L (=9) of the 2-dimensional table is determined. When the counter value is the same value (Y=L), the process goes to step S8, the read address AD is returned to the starting address T of the 2-dimensional table (AD=T), and the line counter Y is returned to 1. On the other hand, in step S7, when the counter value is not the same value (Y<T), there is still data to be read in the 2-dimensional table that follows the previously read data. Therefore, the process goes to step S9, and the read address AD is advanced by the address offset Ao (AD=AD+ Ao). Also the line counter Y is incremented by one line.

In step S10, whether or not the line counter X for the band is the same value as the number of lines B (=6) of the band is determined. When the counter value is not the same value (X<B), there is still a line to be processed in the band being processed, so after incrementing the line counter X for the band in step S11, the process returns to step S5 for processing the next line. On the other hand, in step S10, when the counter value is the same as number of lines B (=6) in the band, it is determined that processing has ended for all of the lines in the band being processed, and advances to step S12. In step S12, the CPU is notified that processing for the band in question is complete.

In step S13, the CPU determines whether or not the counter Band for the band is the same value as the number of bands 3 in the image. When Band<3, there are still remaining bands to be processed, so that in step S14, the CPU increments the counter Band for the band, returns the line counter X in the band to 1, and then returns to step S4 in order to process the next band. On the other hand, in step S13, when Band=3, the CPU determines that processing is complete for all bands and ends processing.

In the flowchart explained above, the counter X for managing the lines in the band, and the counter Y for managing the lines in the 2-dimensional table are independently managed and initialized (X=1 or Y=1). More specifically, the information storage unit 409 manages the values of the number of lines (B=6) in the band and the number of lines (L=9) in the 2-dimensional table, and the counters X and Y, and while comparing each counter with these values, returns the counters to the initial values at appropriate timing. The next read address AD can be seen always being correlated with the counter value Y. With the construction described above, the lines in a band and the lines in a 2-dimensional table can be correlated in order one line at a time with their arranged sequence without damaging their arrangement rules.

For example, referencing the second band in FIG. 9, at the start of processing of the second band, the counter X for the band is X=1, and the counter Y for the 2-dimensional table is set in steps S6 to S9 to Y=7. Therefore, the parameter (table number) of the seventh line in the 2-dimension data (read address AD=T+6Ao) is correlated with the image data of the first line in the second band. Moreover, during processing of the fourth line in the second band, the counter X for the band is X=4; however, the counter Y for the 2-dimensional table is returned to 1 in steps S6 to S8. Therefore, the parameter of the first line in the 2-dimensional table (read address AD=T) is correlated with the fourth line in the second band.

In this way, with this embodiment, it is possible to return the contents of the table storage unit to the first line of the 2-dimensional table even without the CPU performing setting again. In other words, as long as the CPU correlates the first line, correlation with the image data is possible without damaging the arrangement rules of the 2-dimensional table even without setting the parameter for each line during processing for a band, so it is also possible to avoid concern about overhead. That is, with this embodiment, it is possible to perform high-speed image processing while performing tile-shaped correlation without damaging the arrangement rules of the 2-dimensional table with respect to the arrangement sequence of image data.

In the embodiment explained above, an example of construction was given wherein the 2-dimensional table was nine lines, and the image data comprised three bands having six lines each; however, of course the present embodiment is not limited to such construction. The present embodiment can correspond to all cases of performing processing using a 2-dimensional table having L lines of image data comprising a plurality of bands having B lines each. For a 2-dimensional table, the larger the number of lines, or the larger the area, it is possible to reduce the periodicity in the image data, and thus it is possible to avoid moire and the like due to periodicity. Even when the number of lines inside the 2-dimensional table becomes large, it is not necessary to increase the memory capacity of the table retention storage unit 404 inside the circuit, so it is possible to even more effectively use the present embodiment. Moreover, there is a tendency for the number of lines in a band or the number of bands to become large the larger the image data is; however, the effect of the present embodiment of being able to perform high-speed processing with a little memory also becomes larger, the larger the object of processing is.

Furthermore, in the embodiment above, the content of the table storage unit was explained as being one line of the 2-dimensional table, however the present embodiment is not limited to this. Construction is also possible wherein two lines or more (M lines) of the 2-dimensional table are stored in the table storage unit. However, in order to achieve the effect of the embodiment of performing high-speed processing with little memory, it is preferred that M is a value that satisfies the relationship $1 \leq M < L/2$ (where L is the number of lines of the 2-dimensional parameter). No matter how many lines are prepared, as long as the capacity of the table storage unit is less than the 2-dimensional table that is provided externally, it is possible to obtain the effect of high-speed processing by partially reading the parameter of an external memory. However, in the sense of minimizing the scale of the circuit, using one line of memory as the unit of one image processing, as in the case of the embodiment above, is effective. Alternatively, in the case of construction wherein the table is updated at the same time that image processing is performed, preparing twice the memory (two lines of memory) as the unit of image process is preferable from the aspect of improving speed.

In the embodiment above, construction of performing processing using one line at a time as the unit of image processing was explained, however the present embodiment is not limited to this kind of construction. By preparing the memory capacity of the table storage unit to be equal to or greater than the unit of image processing, the effect of the present embodiment can be achieved. For example, when the unit of image processing is two lines, the capacity of the table storage unit can be two lines or more of the 2-dimensional table, and the address offset Ao can be an offset amount of two lines. Moreover, when the unit of image processing is a plurality of lines, depending on the number of lines of the 2-dimensional table, it may be necessary to return the read address of the 2-dimensional table to the first line while in the progress of reading the last plurality of lines of the 2-dimensional table. In that case, reading can be performed by dividing reading of the read address AD into two times; reading the first lines and for returning to the first line. Furthermore, in this embodiment, the 2-dimensional table is used in common with gradation values; however, for example, it is also possible to have a separate table 406 of the same size or a table retention storage unit 404 for part of the gradation values.

Above, INDEX processing was explained as an example; however the present embodiment can correspond to processing of any objective as long as the data processing performs one-on-one correlation of a 2-dimensionally arranged parameter with the individual pixel positions of image data without losing the arrangement rule thereof. For example, the construction of the embodiment above can be applied even when performing a dithering process that binarizes multi-value image data using a dither pattern that is prepared beforehand. Moreover, the construction of the embodiment above can be applied to processing for multi-pass printing that stores a mask pattern, for which allowing or not allowing the printing of dots is set beforehand, in a 2-dimensional table, and sets the dots that will actually be printed in each scan.

A construction, wherein a multi-value image data that is send from host device (PC) connected to the printing apparatus is processed such as above embodiment by the INDEX processing unit 104, is explained. However, a construction can be acceptable in which a multi-value image data made by application software in a host device is processed such as the present embodiment by printer driver software in the host device and the generated image date is send to a printing apparatus and printing operation is performed by the apparatus. Furthermore, a program that is exacted by one or more computer that can actualize processing of the present embodiment described above and storage medium that storages such program are within a scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-168484, filed Jul. 27, 2010, which is hereby incorporated by reference herein in its entirety.

What is claimed is:

1. A data processing apparatus comprising:
   a transfer unit configured to transfer parameters of M ($1 \leq M$) lines of a table, read from a first storage unit, to a second storage unit, the table having L ($L \geq 2$, $L > M$) lines where a plurality of parameters are arranged; and
   an image processing unit configured to perform processing of image data by correlating each of the plurality of parameters of M lines stored in the second storage unit with each pixel of image data of N ($N \geq L$) lines by M lines as a unit,
   wherein, after the processing of the image processing unit for correlating the parameters of M lines to image data is completed, and in a case when the last line of the table is read out, the transfer unit updates the contents stored in the second storage unit by transferring parameters of M lines of starting lines of the table.

2. The data processing apparatus according to claim 1, wherein the image processing unit has the second storage unit for storing parameters of M lines and performs the data processing for M lines as a unit by using the parameters of the M lines stored in the second storage unit.

3. The data processing apparatus according to claim 2, wherein M satisfies $M \leq L/2$.

4. The data processing apparatus according to claim 1, wherein the image processing unit correlates the image data with the parameter, line by line.

5. The data processing apparatus according to claim 1, wherein the image data is multi-valued gradation data, the parameter is data for specifying a dot pattern corresponding to the multi-valued gradation data, and the image processing unit generates binary data by correlating the multi-valued gradation data with the binary dot pattern.

6. The data processing apparatus according to claim 5, wherein the image processing unit is not accessed for specifying the dot pattern while the image processing unit performs data processing for the M lines.

7. A data processing method comprising:
   transferring to a second storage unit, parameters of M ($1 \leq M$) lines of a table, read from a first storage unit, the table having L ($L \geq 2$, $L > M$) lines where a plurality of parameters are arranged; and
   processing of image data by correlating the parameters of M lines stored in the second storage unit with each pixel of image data of N ($N \geq L$) lines by M lines as a unit; and
   wherein, after the processing of the image data correlating the parameters of MI lines to image data is completed, and in a case where when the last line of the table is read out, the contents stored in the second storage unit are updated by transferring parameters of M lines of starting lines of the table.

8. A non-transitory storage medium storing a program for causing a computer to execute the data processing method according to claim 7.

9. The data processing apparatus according to claim 1, further comprising a designation unit configured to designate a read address in the table of the parameters of M lines which is to be transferred to the second storage unit, wherein,
   in a case when the table includes other parameters of M lines subsequent to the parameters of M lines stored in the second storage unit, the designation unit designates the starting address of the subsequent parameters of M lines as the read address, and
   in a case when the table does not include other parameters of M lines subsequent to the parameters of M lines stored in the second storage unit, the designation unit designates the starting address of the table as the read address after the last line of the table is read out.

10. The data processing apparatus according to claim 1, wherein the image data comprises a plurality of bands having B lines ($B \neq M$) and the correlating processing of the image processing unit is performed by each band as a unit.

11. The data processing apparatus according to claim 10, wherein,
   in a case when a process is performed from a first band to a next second band in the image data and when the table includes other parameters of M lines subsequent to the parameters of M lines stored in the second storage unit, the transfer unit updates the contents of the second storage unit by transferring the subsequent parameters of M lines, and
   the image processing unit performs processing of the image data by correlating the parameters of M lines stored in the second storage unit updated by the transfer unit with each pixel of image data of N ($N \geq L$) lines by M lines as a unit.

12. The data processing apparatus according to claim 1, wherein the table is commonly used in each gradation level.

13. The data processing apparatus according to claim 1, wherein the parameter is used to determine a dot pattern corresponding to each pixel location in the image data.

14. The data processing apparatus according to claim 1, wherein the transfer unit transfers the parameters of M lines to the second storage unit by DMA transferring processing.

15. The data processing apparatus according to claim 14, wherein the image processing unit selects one pattern from a plurality of patterns by using the plurality of parameters of M lines stored in the second storage unit according to a position of a pixel of the image data to perform the processing of image data.

16. The data processing apparatus according to claim 15, wherein the parameters are information for setting a number and a position of dots based on a value of multi-value data.

17. The data processing apparatus according to claim 1, wherein the second storage unit, the transfer unit, and the image processing unit are provided in a same processing unit, and the first storage unit is a memory externally-connected to the processing unit.

18. The data processing apparatus according to claim 1, further comprising a printing unit for printing on a printing medium, based on the image data.

19. The data processing apparatus according to claim 1, wherein, after the processing of the image processing unit for correlating the parameters of the M lines to image data is completed,
 in a case when the table includes other parameters of M lines subsequent to the parameters of M lines stored in the second storage unit, the transfer unit updates the contents stored in the second storage unit by transferring the other parameters of M lines subsequent to the stored parameters, and
 in a case when the table does not include other parameters of M lines subsequent to the parameters of M lines stored in the second storage unit, the transfer unit updates the contents stored in the second storage unit by transferring parameters of M lines of starting lines of the table after starting to transfer the last line of the table.

20. The data processing apparatus according to claim 9, further comprising a table line counter for managing a line to be read from the table,
 wherein, in a case when the line to be read is determined to correspond to the last line based on a value of the table line counter, the designation unit designates the starting address of the table as the read address and sets the value of the table line counter to a starting value.

21. The data processing apparatus according to claim 20, wherein, in a case when the line to be read is determined not to correspond to the last line based on the value of the table line counter, the designation unit advances the read address by an address offset and increments the value of the table line counter by one number.

22. The data processing apparatus according to claim 10, further comprising a band line counter for managing a line in the band,
 wherein, in a case when a value of the band line counter is determined to be B, the value of the band line counter is set to a starting value.

\* \* \* \* \*